US012576649B2

(12) United States Patent
Perez Gellida

(10) Patent No.: US 12,576,649 B2
(45) Date of Patent: Mar. 17, 2026

(54) INKJET PRINTING SYSTEM AND METHOD FOR CONTROLLING JETTING TEMPERATURE

(71) Applicant: BOBST MEX SA, Mex (CH)

(72) Inventor: Francisco Javier Perez Gellida, Nyon (CH)

(73) Assignee: BOBST MEX SA, Mex (CH)

( * ) Notice: Subject to any disclaimer, the term of this patent is extended or adjusted under 35 U.S.C. 154(b) by 184 days.

(21) Appl. No.: 18/573,633

(22) PCT Filed: Jul. 7, 2022

(86) PCT No.: PCT/EP2022/068961

§ 371 (c)(1),
(2) Date: Dec. 22, 2023

(87) PCT Pub. No.: WO2023/285291

PCT Pub. Date: Jan. 19, 2023

(65) Prior Publication Data

US 2024/0326459 A1 Oct. 3, 2024

(30) Foreign Application Priority Data

Jul. 12, 2021 (EP) .................................... 21185119

(51) Int. Cl.
*B41J 2/195* (2006.01)
*B41J 2/18* (2006.01)

(52) U.S. Cl.
CPC ................ *B41J 2/195* (2013.01); *B41J 2/18* (2013.01)

(58) Field of Classification Search
CPC ..... B41J 2/195; B41J 2/18; B41J 2/175; B41J 2/17596; B41J 2/04563; B41J 2/04586; B41J 2202/12; B41J 2/16526; B41J 2/04581
See application file for complete search history.

(56) References Cited

U.S. PATENT DOCUMENTS

2010/0073437 A1 3/2010 Shibata et al.
2010/0085396 A1 4/2010 Yokota et al.
2012/0062639 A1 3/2012 Nitta
2016/0368274 A1* 12/2016 Ohtsu ................. B41J 2/17596

FOREIGN PATENT DOCUMENTS

EP 2995458 A1 3/2016
EP 3106311 A2 12/2016
EP 3636441 A1 4/2020
JP 2018149482 A * 9/2018

* cited by examiner

*Primary Examiner* — Jannelle M Lebron
(74) *Attorney, Agent, or Firm* — Bookoff McAndrews, PLLC

(57) ABSTRACT

The invention relates to an inkjet printing system (10) and method for controlling the jetting ink viscosity. A printing head (16) comprises a first pressure sensor (20) located at a fluid inlet (26) and a second pressure sensor (22) located at a fluid outlet (28). A control unit (24) is configured to retrieve the volumetric flow (Q) from a supply pump (18) of the inkjet printing system (10) and the inlet and outlet pressures (P_in, P_out) from the pressure sensors (20, 22). The control unit (24) is further configured to calculate an actual flow resistance (R_a) and a required temperature change (ΔT) of the ink such that a calibrated ink viscosity (μ_ref) is obtained.

16 Claims, 5 Drawing Sheets

INKJET PRINTING SYSTEM AND METHOD FOR CONTROLLING JETTING TEMPERATURE

CROSS-REFERENCE TO RELATED APPLICATION(S)

This application is a National Stage Application under 35 U.S.C. § 371 of International Application No. PCT/EP2022/068961, filed on Jul. 7, 2022, which claims priority to European Application No. 21185119.1, filed on Jul. 12, 2021, the entireties of which are incorporated herein by reference.

FIELD OF INVENTION

The present invention relates to an inkjet printing system and a method for controlling ink temperature within an inkjet printing system.

BACKGROUND OF THE INVENTION

Inkjet printing systems can be used for digitally printing various products, such as packaging products, labels and textiles. They comprise an ink supply and an inkjet printing head dispensing small droplets through nozzles in the printing head.

In order to achieve consistent and high-quality printing, inkjet printing systems require specific ink viscosities. Inks with a high viscosity might not be able to exit from the printing head nozzles, whereas inks with low viscosity may leak out of the printing head or form satellite droplets. Furthermore, when performing inkjet printing on porous substrates, the resulting printing dot is affected by viscosity-dependent spreading of the ink on the substrate and penetration of the ink into the substrate.

Especially in high-throughput industrial inkjet printing, the ink is changed or refilled regularly. The ink change typically involves a change of ink viscosity, for example due to deviating proportions between pigments and solvents or chemical variations in the composition of different ink batches. The ink is manufactured in batches, and each batch may have a different viscosity. Consequently, the ink change may affect the printing quality and consistency.

Document JP 2018 149482 A discloses an ink deterioration detection method for digital inkjet printing. The method is directed to determining ink deterioration and controlling an electro-mechanical jetting mechanism in order to achieve a consistent ink flow and ink jetting volume.

SUMMARY

In view of the above-mentioned problems, it is an object of the present invention to improve the quality and consistency in an inkjet printing system.

This object is solved by a an inkjet printing system comprising an ink store, at least one printing head provided with a plurality of nozzles, at least one supply pump connected to the ink store and configured to supply the printing head with a volumetric flow of ink, a heating system configured to heat the ink from the ink store to an ink jetting temperature, and a control unit, wherein the printing head comprises a first pressure sensor and a second pressure sensor, the first pressure sensor being located at a fluid inlet upstream of the nozzles and being configured to detect an inlet pressure, the second pressure sensor located at a fluid outlet downstream of the nozzles and configured to detect an outlet pressure, and wherein the control unit is configured to retrieve the volumetric flow from the supply pump and the inlet and outlet pressures from the pressure sensors, and wherein the control unit is further configured to calculate an actual flow resistance from the inlet and outlet pressures and the volumetric flow, and wherein the control unit is further configured to calculate based on the actual flow resistance a required temperature change of the ink such that a calibrated ink viscosity is obtained, and wherein the control unit is further configured to control the heating system in order to modify the ink jetting temperature based on the calculated required temperature change.

As an example, the ink jetting temperature can be the temperature of the ink at the nozzles.

The invention is based on a first realization that the ink flow resistance within the inkjet printing system is proportional to the ink viscosity and by monitoring the ink flow resistance, the viscosity can be easily controlled. The flow resistance is according to the Hagen-Poiseuille law directly proportional to the dynamic ink viscosity. The correlation between flow resistance and dynamic ink viscosity can for example be determined by calibrating the inkjet system with a test ink of known viscosity.

In common inkjet systems, there is typically a degradation in the fluidic path caused by debris build-up, which increases over time. However, this degradation and the flow resistance linked to the degradation can be seen as unchanged at a specific and short instance in time such as during the change or refilling of an ink reservoir. Therefore, at the time when the ink in the inkjet printing system is refilled, a calibrated flow resistance corresponding to the actual flow resistance can be determined before the refilling of ink. This calibrated flow resistance includes both the resistance caused by the degradation and the ink viscosity. By controlling the temperature of the ink to obtain the same resistance after the change of ink, a consistent ink viscosity to the previous ink batch can be obtained. In such a way, there is not a need to determine the actual level of degradation in the fluidic circuit.

The term "ink store" defines the entire ink storage in the printing machine and may comprise a plurality of ink reservoirs. The term can also be referred to as the "ink supply" within the context of this invention.

In an example, the correlation between the flow resistance R and the viscosity u may be expressed by the following equation $$R = \frac{\text{P\_in} - \text{P\_out}}{Q} = \mu C$$

where P_in being the inlet pressure, P_out being the outlet pressure, Q being the volumetric flow and C being a constant related to the geometry of the ink path. A second realization is that the ink viscosity can be adjusted by modifying the ink temperature. In an example, the correlation between the ink viscosity and the ink temperature can be expressed by a two parameters model, a three parameters model, a four parameters model or an empirical model, such as the Walther formula, the Wright model or the Seeton model.

Based on these realizations, the present inkjet printing system allows to detect ink viscosity changes, for example due to a change of the ink, by monitoring of the flow resistance and to directly compensate for these changes by modifying the ink temperature such that a desired (i.e. calibrated) viscosity is obtained, thus improving inkjet printing quality and consistency.

In an embodiment, the ink store of the inkjet printing system is refillable. In this context, “refillable” means that new ink, in particular a new ink batch, can be introduced into the inkjet system. In other words, the ink within the inkjet system can be changed. This can be for example done by an actual filling process or by replacing or exchanging an ink reservoir in parts or completely.

In a further embodiment, the control unit comprises a memory and is configured to determine the actual flow resistance before a change of ink in the ink store and to store said actual flow resistance as a calibrated flow resistance in the memory. The control unit is further configured to determine the actual flow resistance after the change of ink in the ink store and to calculate the required temperature change based on a difference between the calibrated flow resistance and the actual flow resistance after the change of ink in the ink store.

A change of ink means a change in the composition of the ink. This change is effectuated by a complete or partial refilling of an ink reservoir or a replacement of an ink reservoir.

The control unit may also be configured to continuously calculate and monitor the actual flow resistance and store calculated values of the actual flow resistance in the memory. This allows detection of potential progressive degradation in the fluidic path. A progressive degradation in the fluidic path may otherwise be mistaken for a viscosity change.

In an embodiment, the actual flow resistance before the change of ink is selected as a calibrated flow resistance. In an embodiment, the control unit can be configured to determine the actual flow resistance when the machine is in a configuration for changing the ink. This configuration can include a specific mode or when the machine is being turned off.

In an embodiment, the calibrated flow resistance is determined each time the ink store is refilled.

In an embodiment, the control unit is configured to calculate a difference between the calibrated flow resistance and the actual flow resistance, and compare the difference to a threshold, and to change the temperature only if the difference exceeds the threshold.

The inkjet printing system may comprise a plurality of printing heads and wherein the control unit is configured to calculate an actual flow resistance for each printing head and calculate an average flow resistance and compare the average flow resistance to the calibrated flow resistance. By calculating an average, the calculated value of the actual flow resistance can be more precise and any misreading from individual sensors cane be excluded.

Preferably, the ink store of the inkjet printing system comprises a main first reservoir and a second reservoir, wherein the pump is a recirculation pump configured to continuously pump ink from the second reservoir through the printing head. The second reservoir can be used to separate a small amount of ink from the main reservoir, enabling a precise control of its physical parameters, such as its temperature. At the same time, the continuous circulation ensures a permanent flow of ink from the second reservoir through the printing head. Due to the permanent flow, the ink from the second reservoir is continuously intermixed, preventing sedimentation of ink components, such as pigments. Furthermore, due to the continuous stream of ink, the ink flow resistance and therefore viscosity can be measured even when the printing head is idle.

In an embodiment, the control unit is configured to modify the ink jetting temperature only when an ink reservoir is changed or when the ink in the ink store is changed. To change the ink in the ink store also includes a refilling of the ink in the ink store. This allows to selectively compensate expected batch-to-batch viscosity variations of the printing inks and reduces the process control effort.

In an arrangement for ink temperature control, the inkjet printing system may comprise a heating system comprising a first heating element configured to heat ink in an outlet from the second reservoir and a second heating element located on the fluidic circuit between the second reservoir and the nozzles. This allows pre-conditioning of the ink in the main reservoir with the first heating element and a subsequent fine adjustment of the temperature with the second heating element during circulation.

In an example, the first heating element is configured to heat the ink to a first temperature and a second heating element is configured to further heat the ink to the desired jetting temperature. However, in other embodiments, the heating system may only comprise one of the first and second heating elements.

To enable printing with different inks and colors, the inkjet printing system can comprise a plurality of individual ink circuits, each circuit comprising at least one separate printing head and a separate second reservoir assigned to each printing head, wherein ink from each individual circuit can be individually heated and wherein the pressures in each circuit can be individually measured.

This allows for determining the ink flow resistance in each circuit individually, thereby taking the present condition and age of each individual ink composition and related printing head into account. Furthermore, the temperature and viscosity in each circuit can be adapted individually, thereby adjusting the print quality between the individual printing heads.

In a further embodiment, the control unit is configured to continuously monitor the inlet and outlet pressures. The permanent monitoring enables to track changes in the actual flow resistance over extended periods of time. Advantageously, these tracked changes may not only contain information over previous viscosity changes, but also over potential changes in the ink flow path geometry inside the inkjet printing system, which may be caused for example by printing head aging and/or a built up of ink deposits within the printing head and/or ink conduits.

The object of to the invention is also solved by a method for controlling ink viscosity within an inkjet printing system, the method comprising the steps of:

a) Retrieving a calibrated flow resistance for the printing head;
b) Retrieving a volumetric flow of ink through the printing head, an inlet pressure at an inlet of the printing head and an outlet pressure at an outlet of the printing head;
c) Calculating an actual flow resistance based on the volumetric flow, the inlet pressure and the outlet pressure;
d) Calculating a required temperature change of the ink based on the calibrated flow resistance and the actual flow resistance;
e) Modifying the jetting temperature based on the calculated temperature change such that a calibrated ink viscosity is obtained.

In an embodiment, the inkjet printing system comprises a plurality of printing heads and wherein the steps a) to c) are performed for each printing head and wherein the following steps are subsequently performed:

d) Calculating an average actual flow resistance for the plurality of printing heads;

e) Calculating a required temperature change of the ink based on the calibrated flow resistance and the actual average flow resistance;

f) Modifying the jetting temperature based on the calculated temperature change such that a calibrated ink viscosity is obtained.

The plurality of printing heads may be fluidically connected to the same ink store, and thus configured to receive ink with the same viscosity.

In an embodiment, the step of retrieving a calibrated viscosity and calculating a corresponding calibrated flow resistance is performed before step a).

In one advantageous embodiment of the method, the temperature change is calculated from the actual flow resistance of a first ink and a second actual flow resistance of a second ink. This allows to adjust the temperature of the second ink such that a viscosity difference between both inks is compensated, resulting in the same print quality for both inks. The calibrated flow resistance can thus be determined to correspond to the actual flow resistance of the first ink.

In a further embodiment, the steps b) to c) of the method are continuously repeated. This allows to monitor potential viscosity changes caused by other effects than ink changes and/or to monitor potential changes in the ink flow path geometry inside the inkjet printing system.

In another embodiment of the method, the jetting temperature is only modified when an ink reservoir is changed or when an ink in the reservoir is changed. This results in a decreased complexity and effort of the ink temperature control.

BRIEF DESCRIPTION OF THE DRAWINGS

Further advantages and features will become apparent from the following description of the invention and from the appended figures which show a non-limiting exemplary embodiment of the invention and in which.

DETAILED DESCRIPTION

Figure 1:
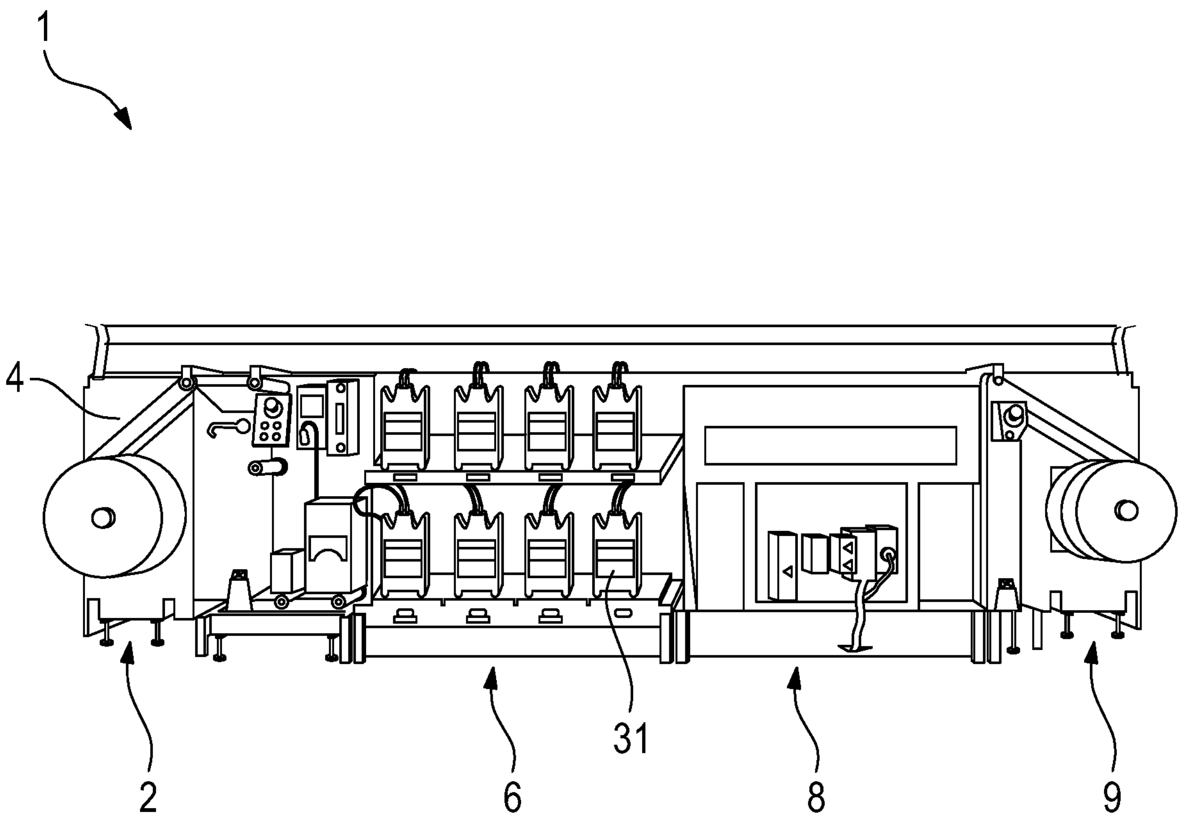
FIG. 1 is a schematic perspective view of a printing press.

FIG. 1 illustrates a printing machine 1 in the form of a digital printing press 1. The digital printing press 1 can for instance be configured to produce labels for packaging products or print on textile material. The illustrated digital printing press 1 comprises an unwinder module 2 configured to be loaded with a material web substrate 4 in the form of rolls, an ink cabinet 6 comprising a plurality of ink reservoirs 31, an inkjet printing module 8 comprising a plurality of printing heads 16, and a winder 9 to assemble the finished printed products into a roll. The inkjet printing module 8 comprises a plurality of inkjet printing systems 10.

Figure 2:
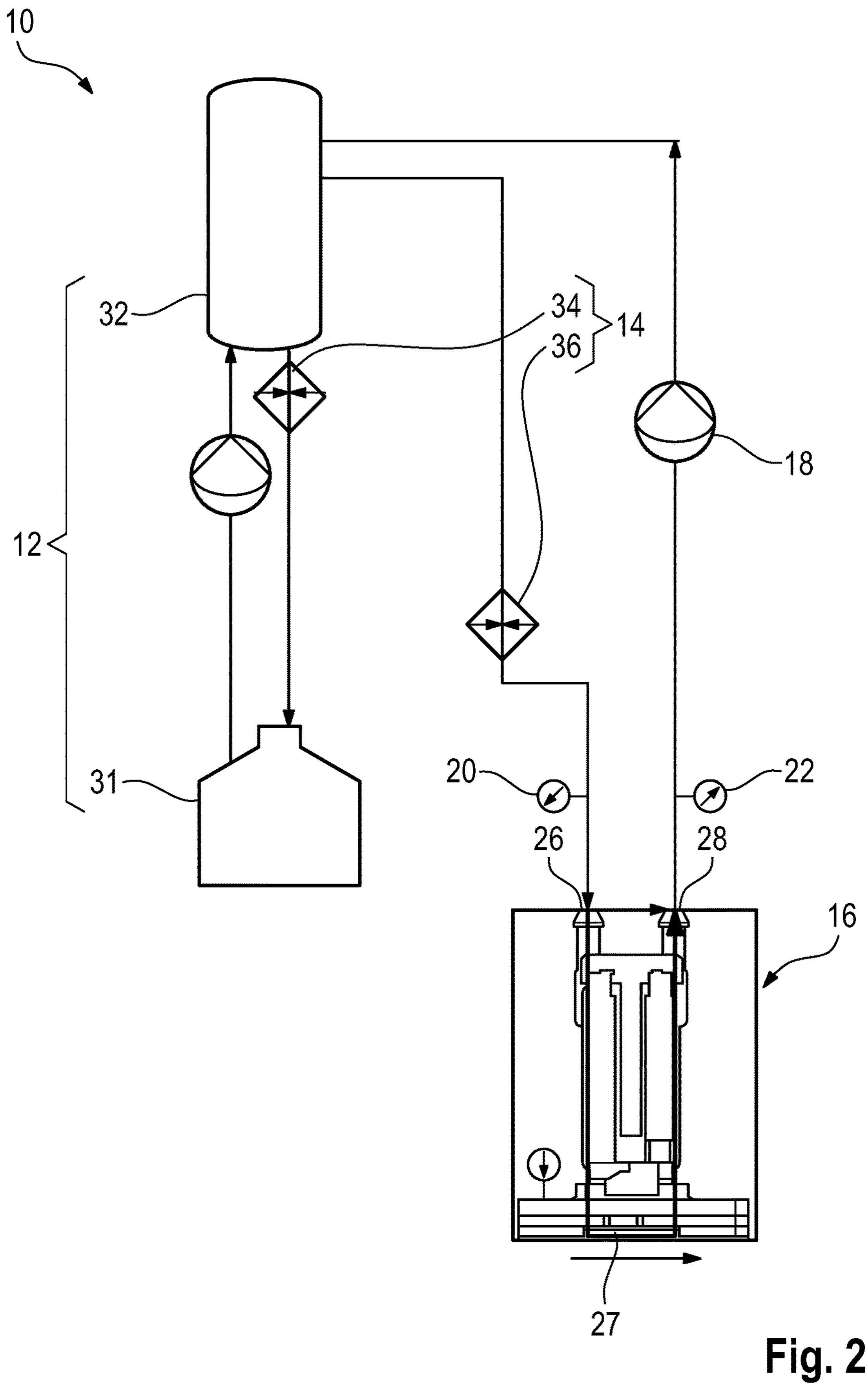
FIG. 2 is a schematic diagram illustrating an inkjet printing system according to an embodiment of present invention.

As schematically illustrated in FIG. 2, the inkjet printing system 10 comprises an ink store 12 which may include a main reservoir 31 and a second reservoir 32. The main reservoir 31 is configured to store a large volume of ink, such as for instance 5 to 20 liters. The second reservoir 32 is configured to store a smaller volume of ink than the main reservoir 31. The second reservoir 32 may be connected in a closed loop to a printing head 16. A heating system 14 is thermally connected to the ink from the ink store 12. The heating system 14 may comprise one or several heating elements 34, 36 configured to heat the ink in a fluidic circuit upstream of the printing head 16 and/or in the printing head 16.

Ink from the second reservoir 32 may be heated by a first heating element 34. The heating element 34 can be located inside or outside the second reservoir 32. In an advantageous embodiment, the first heating element 34 is located on a fluid outlet from the second reservoir 32. The heating element 34 can be configured to heat the ink from the second reservoir 32 to a first temperature T1, which is close to the ink jetting temperature Tj at the printing head 16. The first heater 34 may be configured to increase the temperature of the ink with about 20° C. On a fluidic circuit between the second reservoir 32 and the printing head 16, a supply pump 18, a first pressure sensor 20 and a second pressure sensor 22 are arranged. The supply pump 18, the first pressure sensor 20 and the second pressure sensor 22 are connected to a control unit 24.

The heating system 14 may further comprise a second heating element 36, which is configured to heat the ink in the fluidic circuit between the second reservoir 32 and the fluid inlet 26 to the printing head 16. The second heating element 36 is configured to heat the ink to the jetting temperature Tj.

Figure 3:
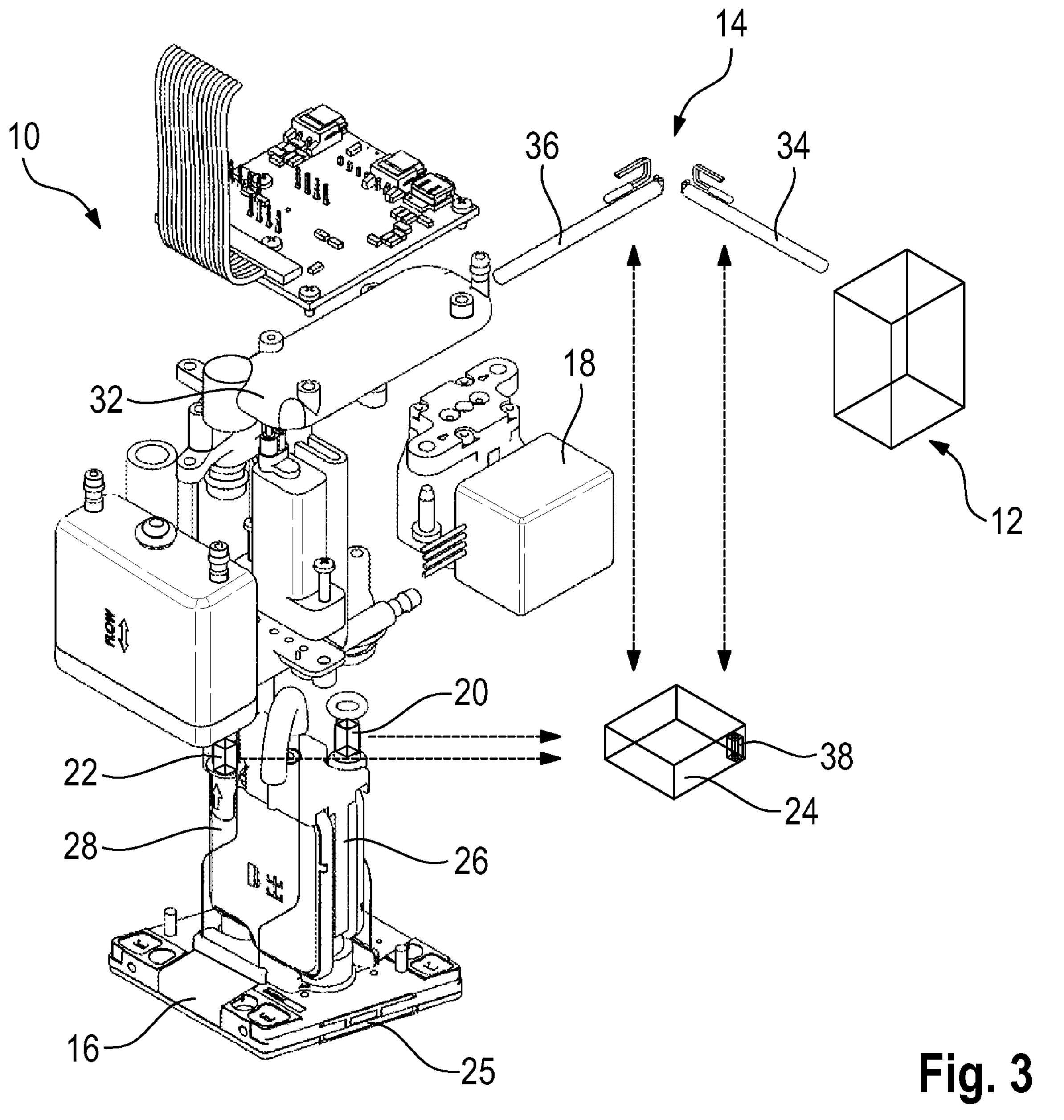
FIG. 3 schematically shows a side view of a first embodiment of an inkjet printing system according to the invention.
Figure 4:
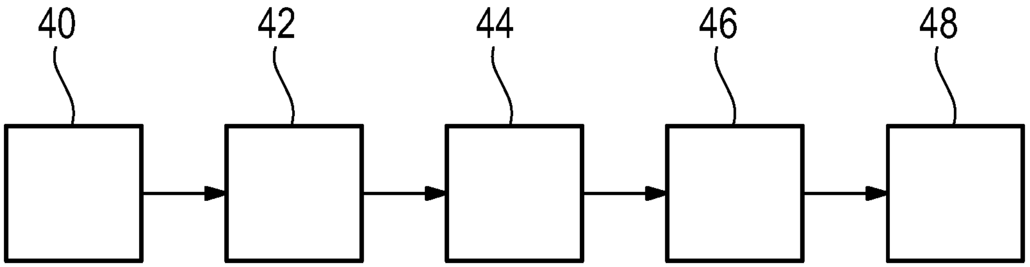
FIG. 4 shows a schematic diagram of a method for controlling ink viscosity within an inkjet printing system according to the invention.

As best seen in FIG. 3, the printing head 16 comprises a plurality of nozzles 25. In the shown embodiment, the printing head 16 is a Dimatix Samba printing head with 2048 individually addressable nozzles arranged on a trapezoidal nozzle plate. However, other types of printing heads with different amounts of nozzles and different shapes can be used.

The printing head 16 comprises a fluid inlet 26, through which ink can enter the printing head 16, a fluid outlet 28, through which ink can leave the printing head 16, and an ink channel 27 connecting the inlet 26 and the outlet 28. The inlet 26 and the outlet 28 of the printing head 16 are both connected to the second reservoir 32 by ink conduits.

The supply pump 18 can be located between the second reservoir 32 and the inlet 26 of the printing head 16. However, as per the illustrated embodiment, the supply pump 18 may be arranged between the outlet 28 of the printing head 16 and the second reservoir 32.

The supply pump 18 can be a recirculation pump configured to continuously pump ink such that the ink flows from the second reservoir 32 through the fluidic conduits, the inlet 26 of the printing head 16, the ink channel 27 within the printing head 16, and the outlet 28 of the printing head 16 and then back into the second reservoir 32 with a volumetric flow Q.

The first pressure sensor 20 is located on the fluid inlet 26 of the printing head 16, upstream of the nozzles 25. The first pressure sensor 20 is configured to detect an inlet pressure P_in of the circulating ink.

The second pressure sensor 22 is located at the fluid outlet 28 of the printing head 16, downstream of the nozzles. The second pressure sensor 22 is configured to detect an outlet pressure P_out of the circulating ink.

The control unit 24 is configured to receive data from the supply pump 18, the first pressure sensor 20, the second pressure sensor 22, the first heating element 34 and the second heating element 36. The control unit 24 is operatively connected to a memory 38. The memory 38 may contain a software program, which causes the control unit 24 to retrieve data and control the ink viscosity μ within the inkjet printing system 10.

The present inkjet printing system is performing a method of controlling the ink viscosity. The method comprises a plurality of steps.

In a first step 40, the control unit 24 retrieves a calibrated flow resistance R_ref from the memory 38. Alternatively, a calibrated ink viscosity μ_ref is retrieved from the memory 38 and a calibrated flow resistance R_ref is calculated. As the viscosity and the flow resistance are proportional, it may be sufficient to perform the method by only monitoring and calculating changes in the actual flow resistance R_a.

In an embodiment, the calibrated ink flow resistance R_ref or the calibrated viscosity μ_ref is a fixed value. Alternatively, the calibrated flow resistance R_ref or calibrated ink viscosity μ_ref can be a range.

The calibrated flow resistance R_ref or the calibrated viscosity μ_ref can be determined from predetermined machine calibration parameters. Alternatively, the calibrated flow resistance R_ref or the calibrated viscosity μ_ref can be specified for the ink. The calibrated flow resistance R_ref or the calibrated viscosity μ_ref can be provided by the memory 38 of the printing press or be entered into the memory 38 by a user input.

In a second step 42, the control unit 24 retrieves a volumetric flow Q of the circulating ink from the supply pump 18. The control unit 24 further retrieves an inlet pressure P_in from the first pressure sensor 20 and an outlet pressure P_out from the second pressure sensor 22.

In a third step 44, the control unit 24 calculates an actual flow resistance R_a based on the volumetric flow Q, the inlet pressure P_in and the outlet pressure P_out.

Hence, the following formula is applied:

$$R = \frac{\text{P\_in} - \text{P\_out}}{Q} = \mu C$$

The actual flow resistance R_a can be determined by calculating a pressure difference between the inlet pressure P_in and the outlet pressure P_out and dividing the pressure difference by the volumetric flow Q. The calculated actual flow resistance R_a is dependent on the viscosity μ of the ink and a flow path geometry between the first pressure sensor 20 and the second pressure sensor 22.

In an embodiment, the control unit 24 continuously repeats the second 42 and the third step 44 in certain intervals, which may be for example intervals of time or ink consumed during the printing process.

By continuously repeating the second 42 and third step 44, the control unit 24 is able to monitor the inlet and outlet pressures P_in, P_out as well as the actual flow resistance R_a throughout the whole printing process. This enables the control unit 24 to identify expected and unexpected flow resistance variations, which may be caused by viscosity changes or ink path degradation between the first 20 and the second pressure sensor 22.

In a fourth step 46, the control unit 24 calculates a required temperature change ΔT of the ink based on the calibrated flow resistance R_ref or calibrated ink viscosity μ_ref. Empirical models, such as the Walther formula, the Wright model or the Seeton model may be applied to calculate the temperature change ΔT necessary to compensate for the deviation between current and calibrated viscosity μ_ref.

In a fifth step 48, the control unit 24 controls the heating system 14 based on the calculated temperature change ΔT such that the ink jetting temperature Tj is changed and the calibrated ink viscosity μ_ref is obtained. In one embodiment, where only a small temperature change, for example +2 C, is necessary to achieve the calibrated viscosity μ_ref, it might be sufficient to adjust the ink temperature T of the circulating ink by controlling the heating power of the second heating element 36 only. In other embodiments, the heating power of the first and the second heating element 34, 36 is changed such that the calibrated ink viscosity μ_ref is obtained.

Figure 5:
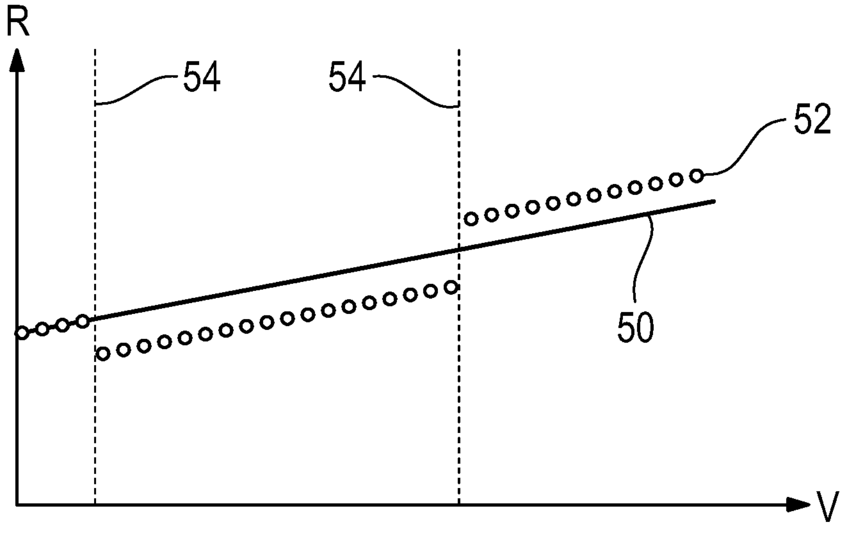
FIG. 5 shows a schematic evolution of an ink flow resistance during an extended printing process.

An example of the development over time of an actual flow resistance R_a over the ink consumption V during an extend printing process is schematically shown in FIG. 5. The straight line 50 illustrates a trend-line of the actual flow resistance R_a within the inkjet printing system 10. For comparison, the actual and measured values of the actual flow resistance R_a development is illustrated by open circles 52. The linear trend line shows an expected theoretical increase in the actual flow resistance R_a due to degradation in the fluidic circuit. A linear evolution is acceptable and expected. However, sudden deviations from the trend line 50 indicate a change in the ink viscosity μ which would need to be accommodated for.

In the described embodiment, the actual flow resistance R_a is expected to increase linearly over the ink consumption V as illustrated by the trend line. Such behavior can for example be caused by ink debris depositing inside the ink channel during the printing process, thereby decreasing the cross section of the channel and/or disturbing the ink flow within the channel.

The dashed vertical lines 54 in FIG. 5 illustrate changes of the ink in the ink store 12. In the illustrated embodiment, the ink is changed two times. Due to batch-to-batch variations of the ink composition, the different batches of ink have different viscosities p. This will result in a different ink viscosity μ if the new ink comes from a different batch than the previous ink.

From FIG. 5, it is apparent that changing the ink results in a sudden change of the actual flow resistance R_a. The continuous monitoring allows distinguishing this effect from the comparatively slow and permanent deposition of debris, causing the depicted linear slope.

In case the viscosity control is inactive, the different viscosities u of the ink batches might result in different print quality, for example due to viscosity related deviations in droplet size and/or droplet spreading on the substrate. To avoid such effect and to increase the consistency of the printing process, the previously described method to control ink viscosity μ can be applied.

In a preferred embodiment of the method, the ink jetting temperature Tj is only modified by the heating system 14 when a reservoir 31 is changed or when an ink in the ink store 12 is changed.

Furthermore, it is possible to measure the actual flow resistance R_a of the first ink shortly before an ink change. Advantageously, due to the viscosity control, the actual flow resistance R_a of the first ink before the ink change can be selected as reference flow resistance R_ref of a second ink.

Figure 6:
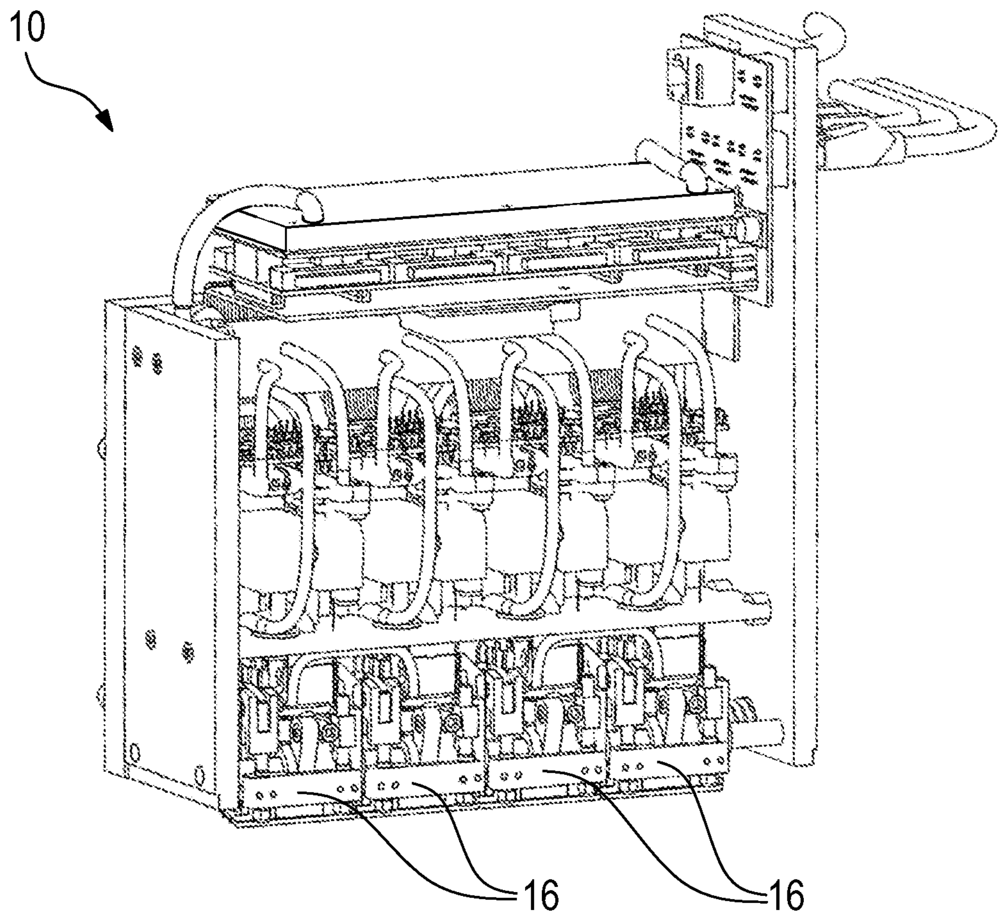
FIG. 6 schematically shows a side view of a second embodiment of an inkjet printing system according to the invention, comprising multiple inkjet printing heads assembled to a print cluster.

Now referring to FIG. 6, which schematically shows a printing cluster comprising a plurality of inkjet printing systems 10. Each inkjet printing system 10 thus comprises a plurality of individual ink circuits.

The plurality of ink circuits are fluidically connected to the second reservoir 32. Fluid connectors are arranged inside the printing cluster and configured to distribute ink from the second reservoir 32 to each printing head 16. Each printing head 16 comprises a first pressure sensor 20 and a second pressure sensor 22 for measuring inlet pressures P_in and outlet pressures P_out. Each printing head 16 may also be connected to a separate recirculation pump 18. Preferably, each printing head 16 is thermally connected to a heating element 36. The heating element 36 can be a separate heating element 36 connected to each printing head 16. Alternatively, a common heating block can be provided for all the printing heads 16 in the same cluster.

In an embodiment, the actual flow resistance R_a can be determined for each individual printing head 16. The control unit 24 may then be further configured to calculate an average flow resistance R_avg for all the printing heads 16 in the cluster. In such a way, the control unit 24 may discard any misreading. A misreading may for instance occur if one sensor is not functioning correctly.

The printing cluster is connected to the control unit 24, which is connected to each of the pressure sensors 20, 22, the recirculation pumps 18, and heating elements 34, 36 by a data connection. Alternatively, each inkjet printing head 16 in the printing cluster comprises a separate control unit 24.

The control unit 24 is configured to retrieve volumetric flows Q_i, inlet pressures P_in_i and outlet pressures P_out_i of the printing heads 16 and to calculate the flow resistance R_i in the printing heads individually from the retrieved values. Furthermore, the control unit 24 is configured to calculate an average flow resistance R_avg for all printing heads 16 in the same printing cluster.

Similar to the first embodiment, the control unit 24 can compare the average flow resistance before an ink change R_avg1 and after R_avg2 an ink change. In the described embodiment, the difference between both average values corresponds to a difference in ink batch viscosities u. If the difference is higher than a given threshold TH, the control unit 24 calculates, based on the flow resistance change, a required temperature change ΔT of the second ink such that a calibrated ink viscosity μ_ref is obtained and the average flow resistance R_avg2 of the second 5 ink batch matches the average flow resistance R_avg1 of the first ink batch after the temperature adjustment. Hence, the average flow resistance R_avg1 before an ink change corresponds to the calibrated flow resistance R_ref.

Furthermore, the control unit 24 is configured to modify a heating temperature Th2 of each second heating element as well as a heating temperature Th1 of the first heating element 34 individually in order to adjust the viscosity μ of the ink in each separate circuit based on the calculated temperature change ΔT, thereby achieving a good print quality with high consistency.

The invention claimed is:

1. An inkjet printing system comprising:

an ink store, at least one printing head provided with a plurality of nozzles, at least one supply pump connected to the ink store and configured to supply the printing head with a volumetric flow of ink, a heating system configured to heat the ink from the ink store to an ink jetting temperature, wherein the heating system includes a first heating element and a second heating element, and wherein the first heating element is configured to heat ink to a first temperature and the second heating element is configured to heat the ink to a jetting temperature, and a control unit, wherein the printing head comprises a first pressure sensor and a second pressure sensor, the first pressure sensor being located at a fluid inlet upstream of the nozzles and being configured to detect an inlet pressure, the second pressure sensor located at a fluid outlet downstream of the nozzles and configured to detect an outlet pressure, wherein the control unit is configured to retrieve the volumetric flow from the supply pump and the inlet and outlet pressures from the pressure sensors, and wherein the control unit is further configured to calculate an actual flow resistance from the inlet and outlet pressures and the volumetric flow, and wherein the control unit is further configured to calculate based on the actual flow resistance a required temperature change of the ink such that a calibrated ink viscosity is obtained, and wherein the control unit is further configured to individually modify a heating temperature of the first heating element and a heating temperature of the second heating element of the heating system in order to modify the ink jetting temperature based on the calculated required temperature change to adjust the ink viscosity.

2. The inkjet printing system according to claim 1, wherein the control unit is configured to only modify the jetting temperature when the ink in the ink store is changed.

3. The inkjet printing system according to claim 1, wherein the control unit is further configured to identify expected and unexpected flow resistance variations.

4. The inkjet printing system according to claim 1, wherein the ink store is refillable and wherein the control unit comprises a memory, the control unit being configured to determine the actual flow resistance before a change of ink in the ink store and to store said actual flow resistance as a calibrated flow resistance in the memory, and wherein the control unit is further configured to determine the actual flow resistance after the change of ink in the ink store and to calculate the required temperature change based on a difference between the calibrated flow resistance and the actual flow resistance after the change of ink in the ink store.

5. The inkjet printing system according to claim 4, wherein the control unit is configured to continuously calculate and monitor the actual flow resistance and store calculated values of the actual flow resistance in the memory.

6. The inkjet printing system according to claim 4, wherein the control unit is configured to calculate a difference between the calibrated flow resistance and the actual flow resistance and compare the difference to a threshold, and to change the temperature only if the difference exceeds the threshold.

7. The inkjet printing system according to claim 4, wherein the inkjet printing system comprises a plurality of printing heads and wherein the control unit is configured to calculate an actual flow resistance for each printing head and calculate an average actual flow resistance for the plurality of printing heads, and compare the average flow resistance to the calibrated flow resistance.

8. The inkjet printing system according to claim 7, wherein the inkjet printing system comprises a plurality of individual ink circuits, each circuit comprising at least one separate printing head and a separate second reservoir assigned to each printing head, wherein ink from each individual circuit can be individually heated and wherein the pressures in each circuit can be individually measured.

9. The inkjet printing system according to claim 1, wherein the ink store comprises a main reservoir and a second reservoir, and wherein the first heating element is configured to heat ink in an outlet from the second reservoir and the second heating element is located on a fluidic circuit between the second reservoir and the nozzle and the second heating element is configured to heat ink in the fluidic circuit.

10. The inkjet printing system according to claim 9, wherein the pump is a recirculation pump configured to continuously pump ink from the second reservoir through the printing head.

11. A method for controlling ink viscosity u within the inkjet printing system according to claim 1, the method comprising:

retrieving a calibrated flow resistance for the printing head;

retrieving a volumetric flow of ink through the printing head, an inlet pressure at an inlet of the printing head and an outlet pressure at an outlet of the printing head;

calculating an actual flow resistance based on the volumetric flow, the inlet pressure and the outlet pressure;

calculating a required temperature change of the ink based on the calibrated flow resistance and the actual flow resistance; and modifying the jetting temperature based on the calculated temperature change such that a calibrated ink viscosity is obtained.

12. The method according to claim 11, wherein the inkjet printing system comprises a plurality of printing heads and wherein the method is performed for each printing head and wherein the method further comprises:

calculating an average actual flow resistance for the plurality of printing heads; and calculating the required temperature change of the ink based on the calibrated flow resistance and the actual average flow resistance.

13. The method according to claim 12, wherein the calibrated flow resistance for a second ink is determined from the actual flow resistance or the actual average flow resistance of a first ink.

14. The method according to claim 11, wherein the obtaining the calibrated ink viscosity and calculating the calibrated flow resistance are performed before the retrieving the calibrated flow resistance.

15. The method according to claim 11, wherein the following operations are continuously repeated:

retrieving a volumetric flow of ink through the printing head, an inlet pressure at an inlet of the printing head and an outlet pressure at an outlet of the printing head; and calculating the actual flow resistance based on the volumetric flow, the inlet pressure, and the outlet pressure, and determining expected and unexpected flow resistance variations.

16. The method according to claim 11, wherein the jetting temperature is only modified when a reservoir is changed or when an ink in the ink store is changed.

* * * * *